Patented Oct. 3, 1944

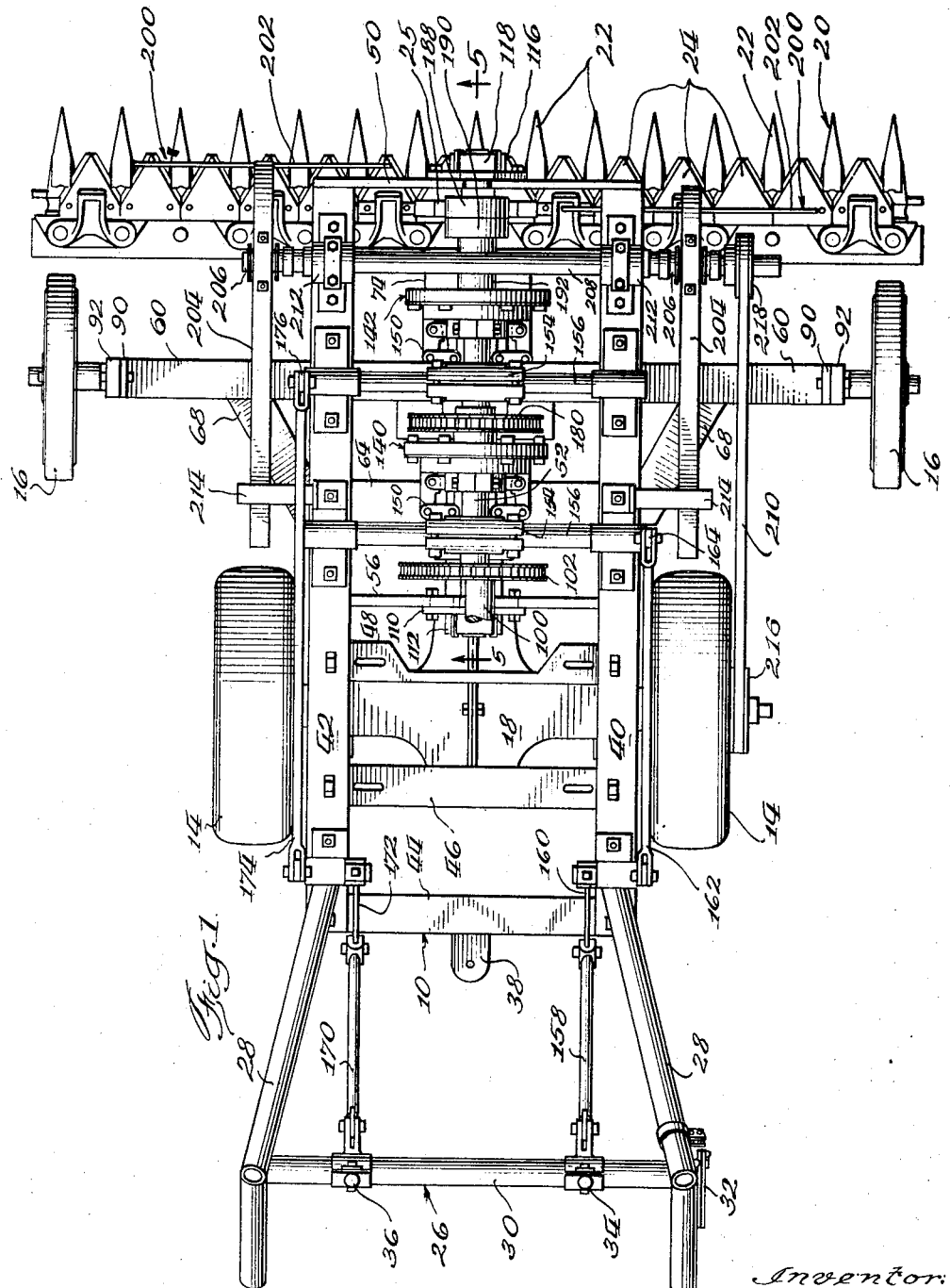

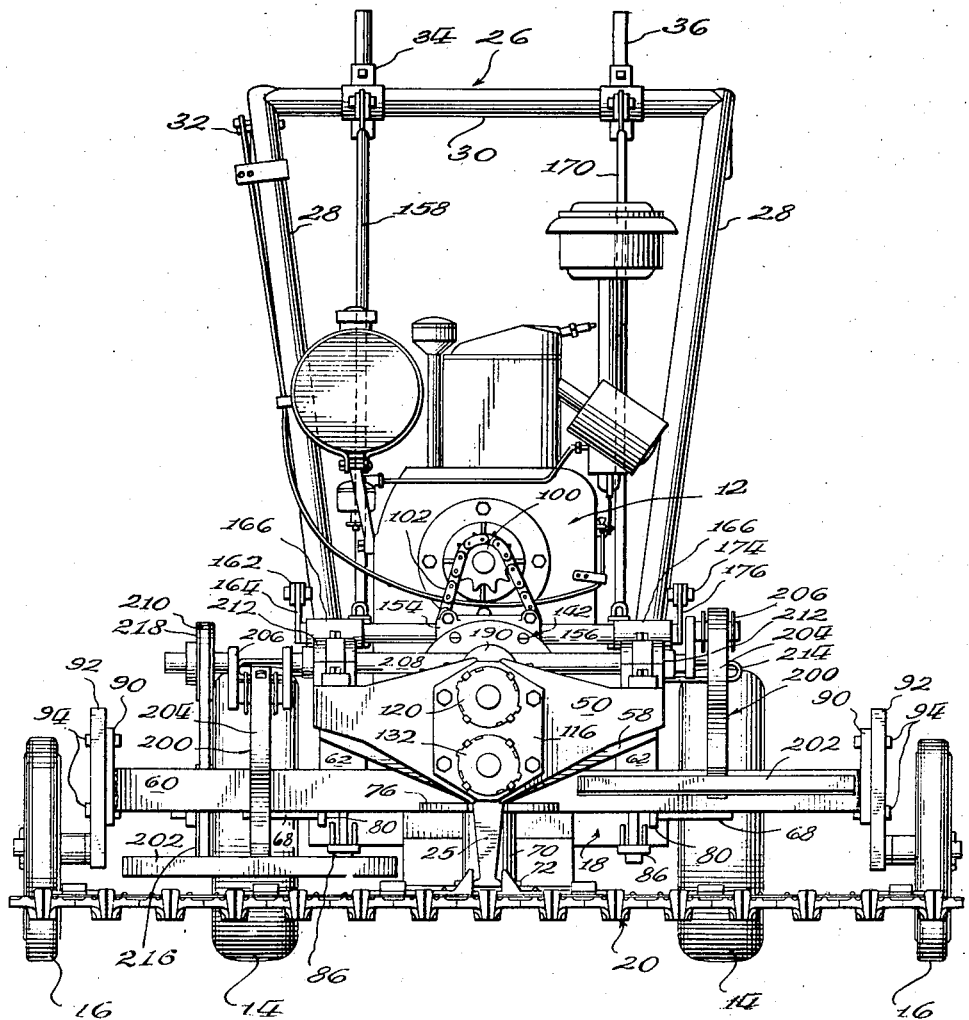

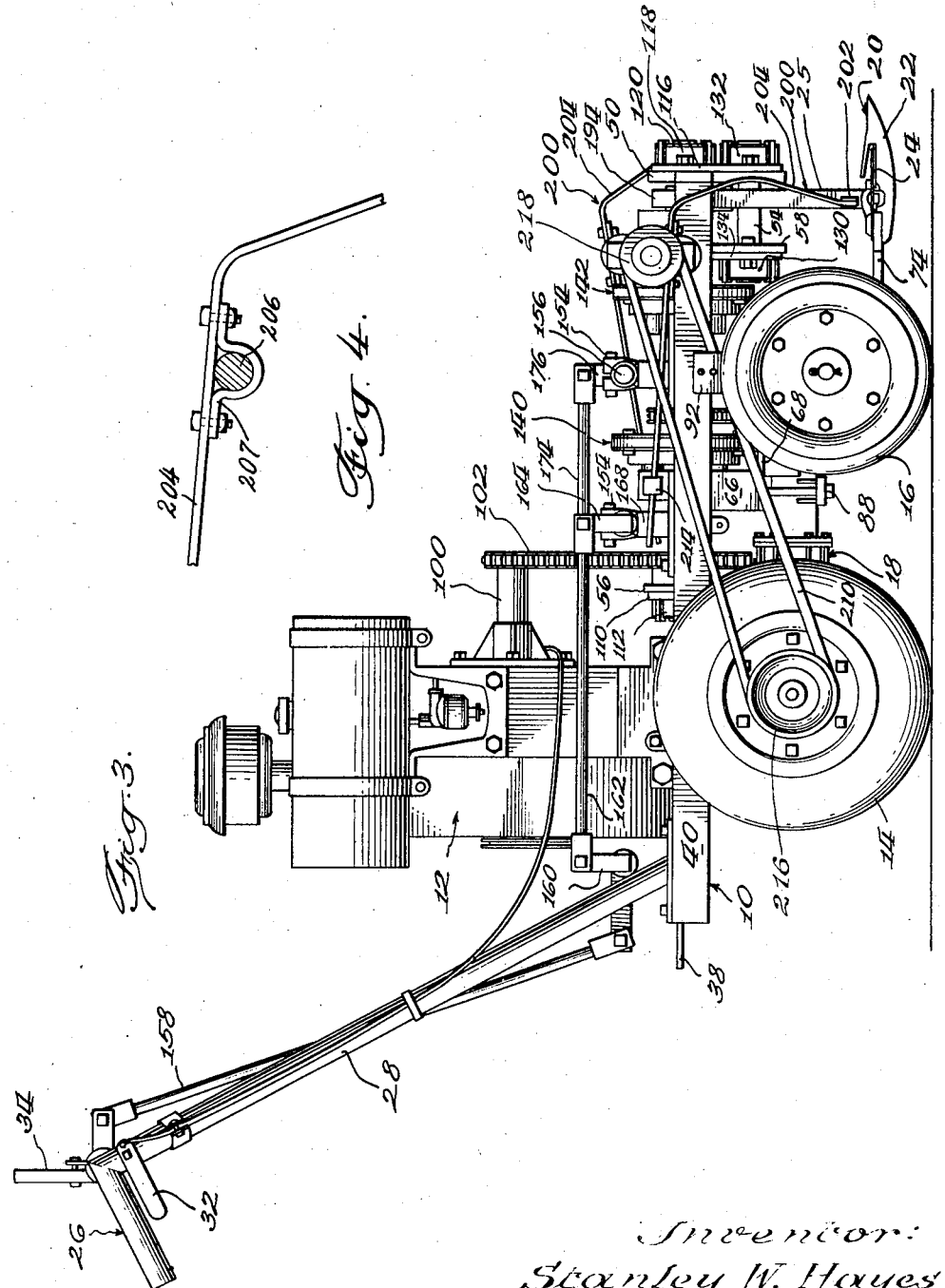

2,359,642

UNITED STATES PATENT OFFICE 2,359,642

MOWER

Stanley W. Hayes, Richmond, Ind., assignor to Hayes Track Appliance Company, Richmond, Ind.

Original application December 16, 1940, Serial No. 370,238. Divided and this application December 18, 1941, Serial No. 423,433. In Canada December 10, 1941

6 Claims. (Cl. 56—26.4)

The present invention relates to mowers and more particularly to power-operated mowers capable of both light and heavy duty operation, such as encountered in the mowing of large lawns, orchards, parks, and the like. This application is a division of my copending application, Serial No. 370,238, filed December 16, 1940, which matured as Patent No. 2,328,803, granted September 7, 1943.

The primary object of the present invention resides in the provision of a new and improved mower having a power actuated tedder cooperatively associated with the cutting means for keeping the latter clear of heavy grass, weeds, and the like, whereby the mower may be used advantageously in the cutting of wet and heavy grass like bluegrass.

A further object of the present invention resides in the provision of new and improved means for actuating the tedder of said mower to remove the cut grass, weeds, and the like from the sickle during the cutting operation.

Other objects and advantages of the present invention will become apparent from the ensuing description, in the course of which reference is had to the accompanying drawings, in which:

Fig. 1 is a top plan view of a mower constructed in accordance with the present invention. The motor for propelling the mower and cutting means has been omitted from this figure in order better to illustrate other details of construction;

Fig. 2 is a front elevational view of the mower with motor attached;

Fig. 3 is a side elevational view of the mower; and

Fig. 4 is a fragmentary cross-sectional view illustrating the operative connection between the tedder actuating arm and its operating crank mechanism.

Referring to the drawings, it may be seen that the mower comprises a frame, indicated generally by reference character 10, supporting a suitable source of power such as a gasoline motor, indicated generally by reference character 12, which may be of any suitable construction. The frame is supported upon rear and front wheels 14 and 16, respectively. The wheels 14 are driven through a differential transmission 18 (see Figs. 1 and 3) which may be of the type used in model T Fords or of any suitable type. The wheels 14 are spaced apart a lesser distance than the wheels 16 in order that the mower may be manipulated more readily and made to turn about a smaller radius. Both wheels are preferably provided with pneumatic tires as indicated.

The mower comprises cutting means, such as the sickle cutter indicated generally by reference character 20, and comprising fixed cutter bars 22 and horizontally reciprocable knives 24 reciprocated by an oscillatable pitman 25.

The mower is adapted to be guided by a handle 26 comprising a pair of spaced apart inclined tubular members 28 suitably secured to the rear end of the frame and a tubular crosspiece 30. A motor throttle controller 32 is attached to one of the members 28, while two clutch controllers 34 and 36, utilized for controlling the connection of the motor to the propelling means and to the cutter operating means, and to which further reference will be had shortly, are rotatably mounted on the crosspiece 30.

A sulky in which the operator can ride (not shown) may be attached to the mower frame by means of a hitch 38, or, if desired, the mower may be guided by an operator walking behind it.

Referring now more particularly to Fig. 1, it may be seen that the frame comprises a pair of longitudinally disposed frame members 40 and 42 of angle iron. The rear ends of these members are connected by an angle iron crosspiece 44, to which the hitch 38 is secured. Angle iron crosspieces 46 and 48 interconnecting the frame members 40 and 42 are utilized to support the motor 12. The front ends of frame members 40 and 42 are interconnected by a crosspiece 50, the generally diamond-shaped contour of which is best illustrated in Fig. 2, and which is also utilized to support the front ends of the main driven shaft 52 (hereinafter referred to as the propulsion shaft) and of the pitman supporting shaft 54. The rear end of the propulsion shaft is supported by a crosspiece 56 located approximately at the longitudinal center of the frame, and the rear end of the pitman shaft 54 is supported by a crosspiece 58 located a short distance behind the front crosspiece 50. Both of these crosspieces are secured as by welding to the frame members 40 and 42, as are the other crosspieces.

The front wheels 16 are secured to the frame by means of an angle iron support 60 suspended below frame members 40 and 42 by a pair of downwardly extending angle iron supports 62 (see Fig. 2). Additional rigidity is given to the wheel support 60 by a crosspiece 64 supported below the frame members 40 and 42 by vertically disposed angle iron supports 66 and connected to support 60 by angularly disposed angle iron braces 68 (see Fig. 1). The sickle 20 is supported below the front end of the frame by supporting structure comprising a tubular post 70 terminating in a flange 72 that is bolted to a plate 74 mounting the sickle 20. The post is attached to the wheel support 60 by a pair of brackets 76 welded to the post and support, respectively.

Suitable means are provided for fixedly locating the rear wheels and the transmission with respect to the frame and may, for example, consist of a plate extending downwardly from each side of the frame and adapted to receive the top of the transmission housing. The housing may be attached to the frame by suitable clamping means such as the bolts and plate indicated by the reference character 86 in Fig. 2 and by hangers, such as the hanger indicated by reference character 88 in Fig. 3, securing the drive shaft housing to the crosspiece 64. A more omplete description of the rear wheel mounting is contained in my aforementioned copending application.

The height of the cutter bar above ground is adjustable by means permitting adjustment of the front wheels relative to the frame. This means includes vertically disposed plates 90 secured to the outer ends of wheel support 60 and vertically disposed wheel supporting plates 92 which are provided with a number of openings to receive the attaching bolts 94, whereby the vertical locational relationship of the plates 90 and 92 may be readily adjusted.

The main propulsion shaft is directly connected to a sprocket 100 on the motor shaft by a chain 102 which engages with a sprocket on the propulsion shaft.

The propulsion shaft is journaled for rotation in ball bearings secured to the crosspieces 56 and 50. The rear ball bearing is enclosed in a housing defined by plate 110, a tubular member 112, welded thereto, and a cover plate secured to the open end of said tubular member by any suitable means, such as clips. The plate 110 is secured to the crosspiece 56 by suitable means such as the bolts shown in Fig. 1. The forward bearing is similarly mounted in a housing defined by a plate 116, tubular member 118 and a cover plate 120. Plate 116 is secured to the crosspiece 50, preferably by a plurality of bolts, and the cover plate is secured to the tubular member by clips as best illustrated in Fig. 2.

The pitman shaft 54 is similarly mounted in bearings enclosed in housings 130 and 132 corresponding in construction to the housings in which the bearings of the main propulsion shaft are mounted. The previously referred to plate 116 is also used to support housing 132 on crosspiece 50 while another plate 134, similar to plate 110, is used to support housing 130 on crosspiece 58.

The propulsion shaft is adapted to drive the rear wheels 14 through a clutch, indicated generally by reference character 140, and to drive the sickle 20 through a clutch 142. Both cltuches are mounted on the propulsion shaft in order to conserve space, the clutch 140 being located back of clutch 142. These clutches are identical in construction and are illustrated as being of the Twin Disc type made by the Twin Disc Clutch Company. The particular construction of the clutches does not form any part of this invention, as long as they are carried by the propulsion shaft, and other types may be used. A detailed description of the clutch arrangement is set forth in my copending application Serial No. 370,238, previously referred to.

Clutch 140 is manually controlled by the previously referred to lever 34 rotatably secured to handle 28. This lever is connected to a rockshaft 156 on the clutch by a rod 158, crank 160, a rod 162, and a crank arm 164. Crank 160 is pivotally secured to a handle portion 28 and crank arm 164 is secured directly to the end of rockshaft 156. The latter is rotatably mounted in bearings 166 mounted above frame members 40 and 42 by tubular supports 168.

Clutch 142 is manually controlled by the previously referred to lever 36 also rotatably secured to handle 26. This lever is connected to rockshaft 156 by a rod 170, crank 172, rod 174, and crank arm 176. Crank 172 is pivotally secured to the other handle portion 28 and crank arm 176 is secured directly to the end of the rockshaft 156. The latter is rotatably mounted in bearings 166 just as the rockshaft 156 associated with clutch 140.

The rear wheels 14 of the mower are operatively connected to the clutch 140 by a chain 180 interconnecting a sprocket attached to the driven plate of clutch 140 and a sprocket secured on a drive shaft extending forwardly from the transmission 18. Thus when the motor is in operation and the clutch 140 is engaged the propulsion shaft is effective to drive the mower through the clutch and the driving connection just described.

The sickle operating pitman 25 is operatively connected to clutch 142 through a cam 188, a counterweight 190, and a tubular member 192 welded at opposite ends to the counterweight 190 and the driven plate of the clutch 142 as best illustrated in Fig. 1. Cam 188 and counterweight 190 are of identical construction and are so located that the centers of gravity are on diametrically opposite sides of shaft 52. The mounting of the cam and counterweight and tubular member 192 is more fully described in my previously mentioned copending application as is also their operation and will not be fully described herein.

When the clutch 142 is engaged, the propulsion shaft rotates cam 188 and the latter imparts an oscillatory movement to the pitman 25 and the latter, in turn, imparts reciprocating movement to the cutter blade 24 of sickle 20.

In order to prevent weeds or heavy grass from interfering with the operation of the cutter, the latter has cooperatively associated with it a pair of tedders, indicated generally by reference characters 200. Each of the tedders comprises a horizontally disposed bar 202 movable toward and away from as well as rearwardly across the top of the sickle, when the mower moves forward, by a slightly resilient metallic actuating arm 204 to which movement is imparted by crank arms 206 formed at the opposite ends of a crankshaft 208 rotated slowly from one of the rear wheels 14 by a belt 210 and suitable pulleys 216 and 218 on the rear wheel and crankshaft, respectively. The crankshaft is mounted above the frame in bearings 212 secured above frame members 40 and 42. The actuating arms 204, which extend generally upwardly and then rearwardly from the tedder bars 202, are operatively secured to the oppositely extending crank arms 206 by means of short straps 207 encircling the latter, as best illustrated in Fig. 4. The rear ends of actuating members 204 are movably mounted in U-shaped straps 214 secured to and extending laterally from frame members 40 and 42.

The mower of the present invention is, as evidenced by the foregoing detailed description thereof, adapted simply and economically to be fabricated from parts cut, for the most part, from plate, tubular, or angle iron structural elements. The construction is rugged and will withstand heavy use by reason of its simplified construction.

The use of two clutches associated with a single propulsion shaft driven directly by the motor enables the mower to be built as a compact unit and also gives the operator control over both the forward movement of the mower and the sickle.

In operation, the motor is first started and its speed thereafter controlled by the throttle controller 32 which is readily accessible to the operator as it is, like the clutch controls, mounted on the handle 26. When it is desired to have the mower move forward, it is necessary only to operate clutch controller 34 to effect engagement of clutch 140. Engagement of this clutch, as heretofore described in detail, operatively connects the motor to the rear wheels so that the mower is propelled forward. When it is desired to place the cutter in operation, it is necessary only to effect engagement of clutch 142 by operation of clutch controller 36.

The tedders 200 are operated whenever the mower moves by reason of their actuation from the rear wheels through the belt 210 and pulleys 216 and 218. Upon forward movement of the mower the crankshaft 208 and crank arms 206 are driven in a clockwise direction and through the arms 204 a rotational motion is thereby imparted to the tedder bars 202. The direction of rotation is such that the bars are on the elevated part of their path of travel when they are moving forwardly with respect to the sickle and they pass over the cut grass on the sickle but when the bars are moving rearwardly with respect to the sickle they are on the lower part of their path of travel and as a result push the cut grass backwardly across the sickle and off from its rear edge. Because of this movement, the tedders are effective to prevent clogging of the cutter by heavy grass or weeds and the like, and it has been found in practice that their use enables heavy, wet grass, like bluegrass, to be cut with ease.

Although the invention has been disclosed in connection with the specific details of a preferred embodiment thereof, it should be understood that such details are not intended to be limitative of the invention, except in so far as set forth in the accompanying claims.

Having thus described my invention, what I claim as new and desire to secure by Letters Patent of the United States is:

1. A tedder for use in a mower of the type including a reciprocable sickle type cutter, comprising a bar adapted to be disposed lengthwise over the cutter, a flexible support movably supporting said bar for movement toward and away from and rearwardly crosswise of the top of the cutter for facilitating operation of the cutter, said support comprising a slightly resilient supporting arm extending generally upward and then rearwardly, a rotatable crank arm, a member closely encircling said crank arm and secured to said supporting arm near the forward end of said rearwardly extending portion, and means slidably receiving the back end of said rearwardly extending portion for guiding that end.

2. A tedder for use in a mower of the type including a reciprocable sickle type cutter, comprising a bar adapted to be disposed lengthwise over the cutter, a flexible support movably supporting said bar for movement toward and away from and rearwardly crosswise of the top of the cutter for facilitating operation of the cutter, said support comprising a slightly resilient supporting arm extending generally upward and then rearwardly, said upwardly extending portion being bowed, a rotatable crank arm, a member closely encircling said crank arm and secured to said supporting arm near the forward end of said rearwardly extending portion, and means slidably receiving the back end of said rearwardly extending portion for guiding that end.

3. A tedder for use in a mower of the type including a reciprocable sickle type cutter, comprising a bar adapted to be disposed lengthwise over the cutter, a flexible support movably supporting said bar for movement toward and away and rearwardly crosswise of the top of the cutter for facilitating operation of the cutter, said support comprising a slightly resilient supporting arm extending generally upward and then rearwardly, rotatable crank means operatively connected to said supporting arm and secured to said supporting arm near the forward end of said rearwardly extending portion for moving said supporting arm and bar, and means slidably receiving the back end of said rearwardly extending portion for guiding that end.

4. A tedder for use in a mower of the type comprising a reciprocable sickle type cutter, comprising a bar adapted to be disposed lengthwise over the cutter, a flexible support movably supporting said bar for movement toward and away from and rearwardly crosswise of the top of the cutter for facilitating operation of the cutter, said support comprising a slightly resilient supporting arm, rotatable crank means, means operatively connected to said crank means and secured to said supporting arm intermediate its ends for moving said supporting arm and bar, and means slidably receiving the end of said arm remote from the bar end for guiding the remote end.

5. A tedder for use in a mower of the type comprising a reciprocable sickle type cutter, comprising a bar adapted to be disposed lengthwise over the cutter, a support movably supporting said bar for movement toward and away from and rearwardly crosswise of the top of the cutter for facilitating operation of the cutter, said support comprising a slightly resilient portion extending generally upwardly from the bar, rotatable crank means, means operatively connected to said crank means and secured to said support for moving said support and bar, said support comprising another portion extending from said crank means, and means slidably receiving the end of said other portion for guiding that end.

6. A tedder for use in a mower of the type comprising a reciprocable sickle type cutter, comprising a bar adapted to be disposed lengthwise over the cutter, a support movably supporting said bar for movement toward and away from and rearwardly crosswise of the top of the cutter for facilitating operation of the cutter, said support comprising a portion of slightly resilient material extending generally upwardly from the bar, and movable means operatively connected to said support for moving said support and bar, said support and movable means being constructed and arranged to enable said bar to be adjusted to different positions vertically and crosswise of the cutter.

STANLEY W. HAYES.